United States Patent
Sautron (10) Patent No.: US 10,358,221 B2
(45) Date of Patent: Jul. 23, 2019

(54) HYBRID METHOD AND AIRCRAFT FOR PRE-COOLING AN ENVIRONMENTAL CONTROL SYSTEM USING A POWER GENERATOR FOUR WHEEL TURBO-MACHINE

(71) Applicant: GE AVIATION SYSTEMS, LLC, Grand Rapids, MI (US)

(72) Inventor: Dominique Patrick Sautron, Chicago, IL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/244,557

(22) Filed: Aug. 23, 2016

(65) Prior Publication Data
US 2018/0057173 A1     Mar. 1, 2018

(51) Int. Cl.
| | | |
|---|---|---|
| *F02C 9/18* | (2006.01) | |
| *H02K 7/18* | (2006.01) | |
| *B64D 13/06* | (2006.01) | |
| *F01D 15/10* | (2006.01) | |

(52) U.S. Cl.
CPC .............. *B64D 13/06* (2013.01); *F01D 15/10* (2013.01); *F02C 9/18* (2013.01); *H02K 7/1823* (2013.01); *B64D 2013/0618* (2013.01); *B64D 2013/0644* (2013.01); *Y02T 50/56* (2013.01)

(58) Field of Classification Search
CPC ....... F01D 15/10; H02K 7/1823; Y02E 10/22; B64D 13/06; B64D 2013/0618; F02C 9/18
USPC .......................................................... 290/52
See application file for complete search history.

(56) References Cited

U.S. PATENT DOCUMENTS

| | | | | |
|---|---|---|---|---|
| 2,800,002 A | * | 7/1957 | Seed ...................... | B64D 13/06 62/241 |
| 3,441,045 A | * | 4/1969 | Malone ................ | B01F 5/0495 137/114 |
| 4,262,495 A | * | 4/1981 | Gupta ................... | B64D 13/06 62/172 |
| 4,378,920 A | * | 4/1983 | Runnels ................ | B64D 37/32 137/209 |
| 4,503,666 A | * | 3/1985 | Christoff ............... | B64D 13/06 60/39.183 |
| 4,684,081 A | * | 8/1987 | Cronin .................. | B64D 13/06 244/118.5 |

(Continued)

FOREIGN PATENT DOCUMENTS

CN          102341590 A     2/2012

OTHER PUBLICATIONS

Extended European Search Report and Opinion issued in connection with corresponding EP Application No. 17187029.8 dated Jan. 9, 2018.

(Continued)

*Primary Examiner* — Charles Reid, Jr.
(74) *Attorney, Agent, or Firm* — McGarry Bair PC (57) ABSTRACT

A method and aircraft for providing bleed air to environmental control systems of an aircraft using a gas turbine engine, including determining a bleed air demand for the environmental control systems, proportionally supplying low pressure and high pressure bleed air to the environmental control systems, wherein the proportional supplying is controlled such that the conditioned air stream satisfies the determined bleed air demand.

16 Claims, 6 Drawing Sheets

(56) References Cited

U.S. PATENT DOCUMENTS

| | | | | |
|---|---|---|---|---|
| 5,036,678 A * | 8/1991 | Renninger | ............ | B64D 13/06 62/402 |
| 5,143,329 A * | 9/1992 | Coffinberry | ............ | F02C 7/277 244/118.5 |
| 5,813,630 A * | 9/1998 | Williams | ............... | B64D 13/06 244/118.5 |
| 5,899,085 A | 5/1999 | Williams | | |
| 5,899,805 A * | 5/1999 | Dowd | .................... | B64D 13/00 137/875 |
| 5,967,461 A * | 10/1999 | Farrington | ............ | B64D 13/06 244/118.5 |
| 6,189,324 B1 * | 2/2001 | Williams | ............... | B64D 13/06 62/172 |
| 6,526,775 B1 * | 3/2003 | Asfia | ...................... | B64D 13/06 62/401 |
| 6,629,428 B1 * | 10/2003 | Murry | .................... | B64D 13/06 62/401 |
| 6,681,592 B1 * | 1/2004 | Lents | ...................... | B64D 13/06 62/401 |
| 6,796,131 B2 * | 9/2004 | Sampson | ............... | B64D 13/06 244/118.5 |
| 6,942,183 B2 * | 9/2005 | Zywiak | .................. | B64D 13/00 165/101 |
| 7,607,318 B2 * | 10/2009 | Lui | ........................ | B64D 13/06 244/118.5 |
| 7,618,008 B2 * | 11/2009 | Scherer | .................. | B64D 13/06 165/58 |
| 8,461,710 B1 * | 6/2013 | Brostmeyer | .............. | F02C 7/36 290/52 |
| 8,904,805 B2 | 12/2014 | Hipsky et al. | | |
| 8,967,528 B2 | 3/2015 | MacKin et al. | | |
| 9,021,780 B2 * | 5/2015 | Bowman | .................... | F02C 7/32 60/39.24 |
| 9,752,462 B1 * | 9/2017 | Fletcher | .................... | F01K 11/02 |
| 9,810,050 B2 * | 11/2017 | Sites | ...................... | E21B 43/006 |
| 2003/0005718 A1 * | 1/2003 | Mitani | .................. | B64D 13/06 62/402 |
| 2010/0107594 A1 | 5/2010 | Coffinberry et al. | | |
| 2011/0315130 A1 * | 12/2011 | Kardos | .................... | F01N 3/023 123/568.12 |
| 2013/0192250 A1 * | 8/2013 | Glahn | ...................... | F01D 11/04 60/782 |
| 2013/0192252 A1 * | 8/2013 | Ackermann | ............. | F01D 11/04 60/782 |
| 2014/0250898 A1 * | 9/2014 | Mackin | ...................... | F02C 6/08 60/772 |
| 2015/0065023 A1 | 3/2015 | Bruno | | |
| 2015/0247463 A1 * | 9/2015 | DeFrancesco | ......... | B64D 13/08 60/782 |
| 2015/0354464 A1 * | 12/2015 | Hillel | ........................ | F02C 3/04 415/1 |
| 2016/0218590 A1 * | 7/2016 | Oxman | .................. | F04D 17/122 |
| 2016/0369695 A1 * | 12/2016 | Perlak | ....................... | F02C 3/04 |
| 2017/0268430 A1 * | 9/2017 | Schwarz | ................. | F02C 9/18 |

OTHER PUBLICATIONS

Machine Translation and Copy of First Office Action and Search issued in connection with corresponding CN Application No. 201710730169.6 dated Dec. 25, 2018(English Translation not available).

* cited by examiner

HYBRID METHOD AND AIRCRAFT FOR PRE-COOLING AN ENVIRONMENTAL CONTROL SYSTEM USING A POWER GENERATOR FOUR WHEEL TURBO-MACHINE

BACKGROUND OF THE INVENTION

Contemporary aircraft have bleed air systems that take hot air from the engines of the aircraft for use in other systems on the aircraft including environmental control systems (ECS) such as air-conditioning, pressurization, and de-icing. The ECS can include limits on the pressure or temperature of the bleed air received from the bleed air systems. Currently, aircraft engine bleed systems make use of a pre-cooler heat exchanger to pre-condition the hot air from the engines to sustainable temperatures, as required or utilized by the other aircraft systems. The pre-cooler heat exchangers produce waste heat, which is typically exhausted from the aircraft without utilization.

BRIEF DESCRIPTION OF THE INVENTION

In one aspect of the present disclosure, a method of providing bleed air to environmental control systems of an aircraft using a gas turbine engine includes determining a bleed air demand for the environmental control systems, selectively supplying low pressure bleed air and high pressure bleed air from a compressor of the gas turbine engine to a first turbine section and compressor section of a turbo air cycle machine, with the first turbine section emitting a cooled air stream and the compressor section emitting a compressed air stream, selectively supplying the cooled air stream to a second turbine section with the second turbine section emitting a further cooled air stream, combining at least one of the cooled air stream emitted from the first turbine section or the further cooled air stream emitted from the second turbine section with the compressed air stream emitted from the compressor section to form a conditioned air stream, transforming excess mechanical power into electrical power via a generator; and delivering electrical power to at least one device or system, wherein the selectively supplying low pressure bleed air and high pressure bleed air and selectively supplying the cooled air stream are controlled such that the conditioned air stream satisfies the determined bleed air demand and wherein operation of at least one of the first turbine section or second turbine section creates the excess mechanical power.

In another aspect of the present disclosure, an aircraft includes an environmental control system having a bleed air inlet, a gas turbine engine having at least one low pressure bleed air supply and at least one high pressure bleed air supply, a turbo air cycle machine having rotationally coupled first turbine section, second turbine section and compressor section, an upstream turbo-ejector fluidly coupling the low and high pressure bleed air supplies to the first turbine section and compressor section, a downstream turbo-ejector fluidly combining fluid outputs from at least one of the first turbine section or the second turbine section with fluid output from the compressor section into a common flow that is supplied to the bleed air inlet of the environmental control systems, a rotatable shaft operably coupled with at least one of the first turbine section and the second turbine section, and a generator selectively coupled to the rotatable shaft and having a power output.

In yet another aspect of the present disclosure, a method of providing air to an environmental control systems of an aircraft, the method includes selectively supplying low pressure bleed air and high pressure bleed air from a compressor of the gas turbine engine to a turbo air cycle machine to precondition the bleed air according to operational demands of the environmental control systems where the preconditioning comprises selectively providing a fluid output emitted from a first turbine section of the turbo air cycle machine to a second turbine section of the turbo air cycle machine for further cooling and wherein at least one of the first turbine section and the second turbine section produce shaft work output, transforming at least some of the shaft work output into electrical power via a generator and delivering electrical power to at least one device or system.

DESCRIPTION OF EMBODIMENTS OF THE INVENTION

Figure 1:
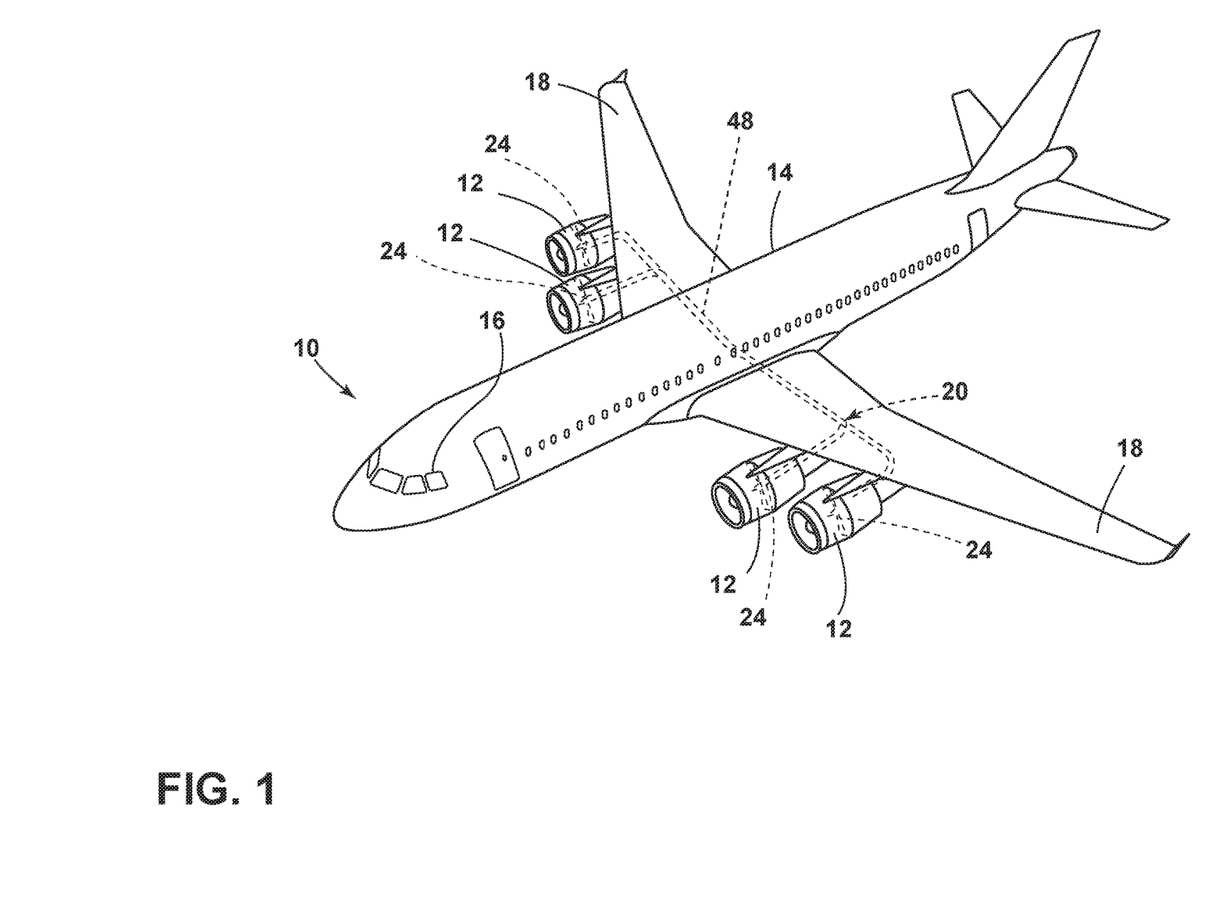
FIG. 1 is a perspective view of an aircraft having a bleed air system in accordance with various aspects described herein.

FIG. 1 illustrates an embodiment of the disclosure, showing an aircraft 10 that can include a bleed air system 20, only a portion of which has been illustrated for clarity purposes. As illustrated, the aircraft 10 can include multiple engines, such as gas turbine engines 12, a fuselage 14, a cockpit 16 positioned in the fuselage 14, and wing assemblies 18 extending outward from the fuselage 14. The aircraft can also include an environmental control system (ECS) 48. The ECS 48 is schematically illustrated in a portion of the fuselage 14 of the aircraft 10 for illustrative purposes only. The ECS 48 is fluidly coupled with the bleed air system 20 to receive a supply of bleed air from the gas turbine engines 12.

The bleed air system 20 can be connected to the gas turbine engines 12 such that high temperature, high pressure air, low pressure air, low temperature, or a combination thereof received from the gas turbine engines 12 can be used within the aircraft 10 for environmental control of the aircraft 10. More specifically, an engine can include a set of bleed ports 24 arranged along the gas turbine engine 12 length or operational stages such that bleed air can be received, captured, or removed from the gas turbine engine 12 as the corresponding set of bleed ports 24. In this sense, various bleed air characteristics, including but not limited to, bleed air mass flow rate (for example, in pounds per minute), bleed air temperature or bleed air pressure, can be selected based on the desired operation or bleed air demand of the bleed air system 20. Further, it is contemplated that ambient air can be used within the aircraft 10 for environmental control of the aircraft 10. As used herein, the environmental control of the aircraft 10, that is, the ECS 48 of the aircraft 10, can include subsystems for anti-icing or de-icing a portion of the aircraft, for pressurizing the cabin or fuselage, heating or cooling the cabin or fuselage, and the like. The operation of the ECS 48 can be a function of at least one of the number of aircraft 10 passengers, aircraft 10 flight phase, or operational subsystems of the ECS 48. Examples of the aircraft 10 flight phase can include, but is not limited to ground idle, taxi, takeoff, climb, cruise, descent, hold, and landing. The demand of the bleed air system 20 by the ECS can be dynamic as, for example, subsystems are needed based on aircraft 10 conditions.

While a commercial aircraft 10 has been illustrated, it is contemplated that embodiments of the invention can be used in any type of aircraft 10. Further, while two gas turbine engines 12 have been illustrated on the wing assemblies 18, it will be understood that any number of gas turbine engines 12 including a single gas turbine engine 12 on the wing assemblies 18, or even a single gas turbine engine mounted in the fuselage 14 can be included.

Figure 2:
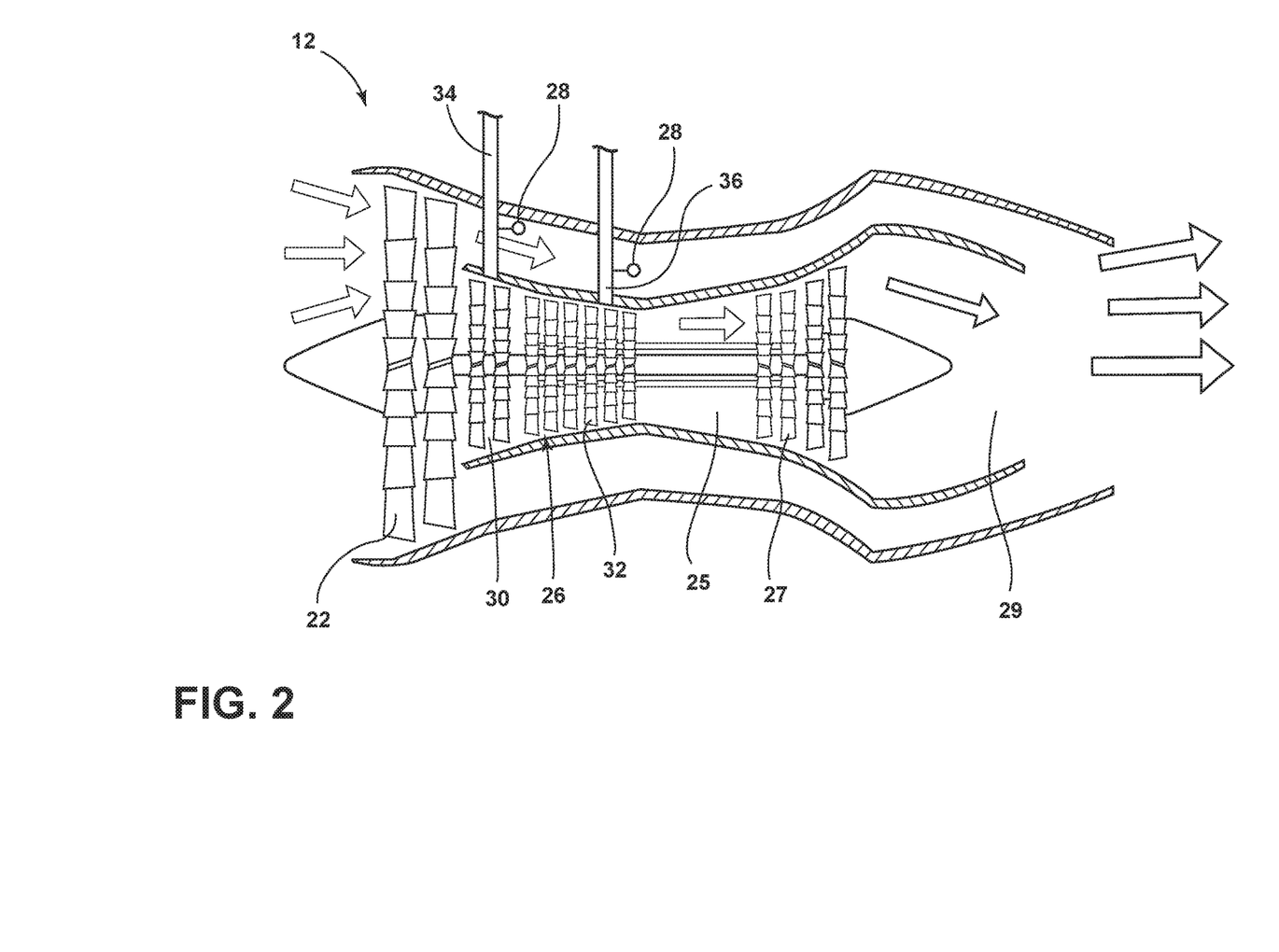
FIG. 2 is a schematic cross-sectional view of a portion of an exemplary aircraft gas turbine engine that can be utilized in the aircraft of FIG. 1.

FIG. 2 illustrates a cross section of the gas turbine engine 12 of the aircraft 10. The gas turbine engine 12 can include, in a serial relationship, a fan 22, a compressor section 26, a combustion section 25, a turbine section 27, and an exhaust section 29. The compressor section 26 can include, in a serial relationship, a multi-stage low pressure compressor 30, and a multi-stage high pressure compressor 32.

The gas turbine engine 12 is also shown including a low pressure bleed port 34 arranged to pull, draw, or receive low pressure bleed air from the low pressure compressor 30 and a high pressure bleed port 36 arranged to pull, draw, or receive high pressure bleed air from the high pressure compressor 32. The bleed ports 34, 36 are also illustrated coupled with various sensors 28, which can provide corresponding output signals. By way of non-limiting example, the sensors 28 can include respective temperature sensors, respective flow rate sensors, or respective pressure sensors. While only a single low pressure bleed port 34 is illustrated, the low pressure compressor 30 can include a set of low pressure bleed ports 34 arranged at multiple stages of the compressor 30 to pull, draw, or receive various bleed air characteristics, including but not limited to, bleed air mass flow rate, bleed air temperature, or bleed air pressure. Similarly, while only a single high pressure bleed port 36 is illustrated, the high pressure compressor 32 can include a set of high pressure bleed ports 36 to pull, draw, or receive various bleed air characteristics, including but not limited to, bleed air mass flow rate, bleed air temperature, or bleed air pressure. Non-limiting embodiments of the disclosure can further include configurations wherein at least one of the low or high pressure bleed port 34, 36 can include a bleed port from an auxiliary power units (APU) or ground cart units (GCU) such that the APU or GCU can provide an augmented pressure and conditioned temperature airflow in addition to or in place of the engine bleed ports 34, 36.

During gas turbine engine 12 operation, the rotation of the fan 22 draws in air, such that at least a portion of the air is supplied to the compressor section 26. The air is pressurized to a low pressure by the low pressure compressor 30, and then is further pressurized to a high pressure by the high pressure compressor 32. At this point in the engine operation, the low pressure bleed port 34 and the high pressure bleed port 36 draw, respectively low pressure air from the low pressure compressor 30 and high pressure air from the high pressure compressor 32 and supply the air to a bleed air system for supplying air to the ECS 48. High pressure air not drawn by the high pressure bleed port 36 is delivered to the combustion section 25, wherein the high pressure air is mixed with fuel and combusted. The combusted gases are delivered downstream to the turbine section 27, which are rotated by the gases passing through the turbine section 27. The rotation of the turbine section 27, in turn, rotates the fan 22 and the compressor section 26 upstream of the turbine section 27. Finally, the combusted gases are exhausted from the gas turbine engine 12 through the exhaust section 29.

Figure 3:
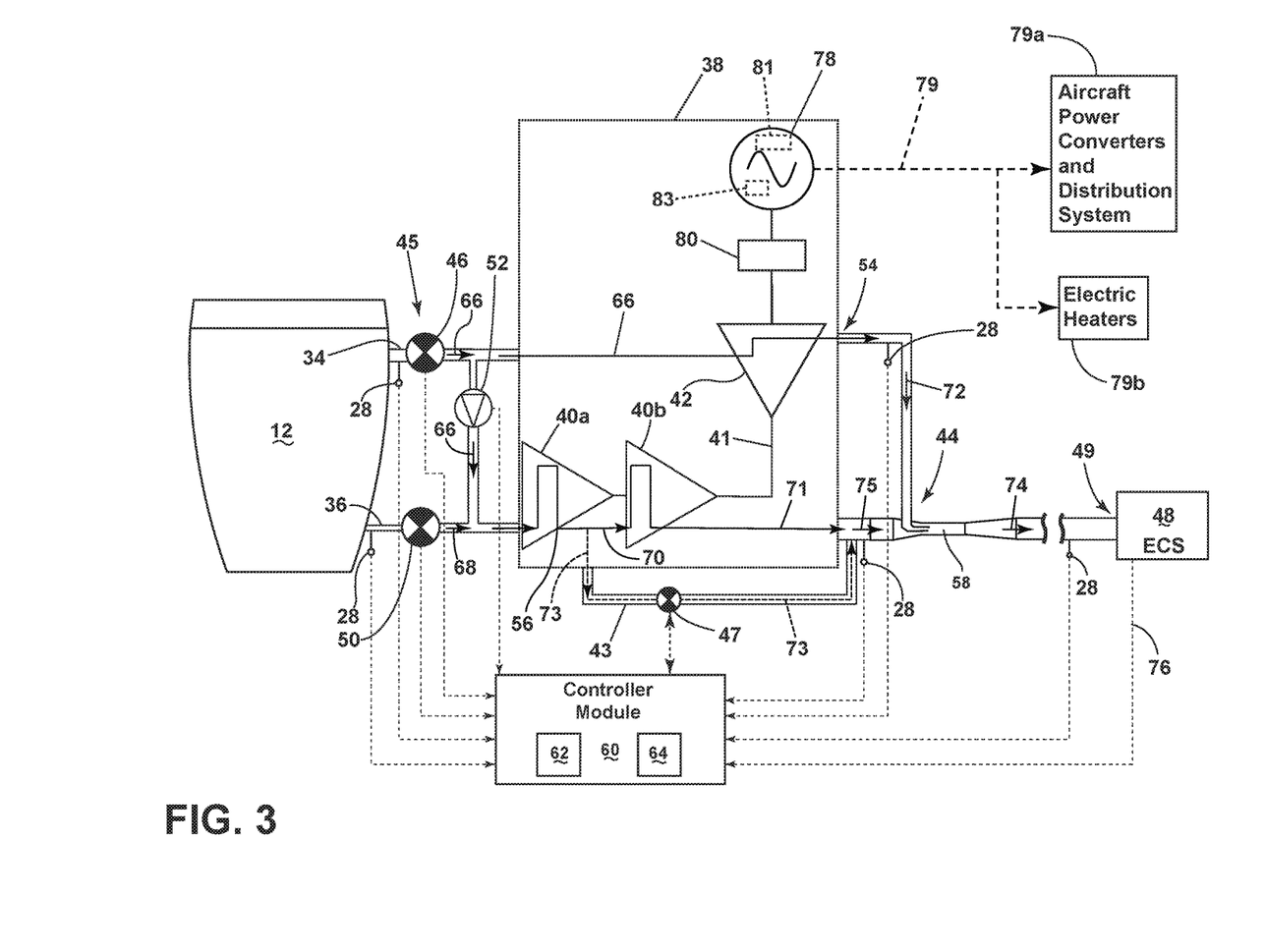
FIG. 3 is a schematic view of a gas turbine engine bleed air system that can be utilized in the aircraft of FIG. 1 in accordance with various aspects described herein.

FIG. 3 illustrates a schematic view of portions of the aircraft 10 including the gas turbine engine 12, the bleed air system 20, and the ECS 48. As shown, the bleed air system 20 can include a turbo air cycle machine 38 fluidly coupled upstream with the set of gas turbine engine (shown only as a single gas turbine engine 12) and fluidly coupled downstream with the ECS 48. The turbo air cycle machine 38 can include a first turbine section 40a, a second turbine section 40b, and a compressor section 42, all of which can be rotatably coupled on a common shaft 41. The bleed air system 20 of the turbo air cycle machine 38 can include a flow mixer or turbo-ejector 44 located downstream from the turbo air cycle machine 38.

The low pressure and high pressure bleed ports 34, 36 can be fluidly coupled with the turbo air cycle machine 38 by way of a proportional mixing or controllable valve assembly 45. Non-limiting examples of the controllable valve assembly 45 can include mixing, proportional mixing, or non-mixing configurations. In another non-limiting example, the proportional mixing assembly can include a proportional mixing-ejector valve assembly. In one aspect, the proportional mixing-ejector valve assembly or controllable valve assembly 45 can be arranged to supply the low pressure and high pressure bleed air to the turbo air cycle machine 38. Non-limiting examples of the proportional mixing-ejector valve assembly or controllable valve assembly 45 can include a turbo-ejector or mixing-ejector assembly, wherein the high pressure bleed port 36 entrains at least a portion of the low pressure bleed air of the low pressure bleed port 34, or "pulls" air from the low pressure bleed port 34, and provides the mixed, combined, or entrained air to the turbo air cycle machine 38. Stated another way, the proportional turbo-ejector or mixing-ejector assembly can simultaneously supply at least a portion of the low pressure bleed air to the compressor section 42 and entrain another portion of the low pressure bleed air with the high pressure bleed air.

A generator 78 is illustrated as being operably coupled to the common shaft 41. In this sense, the turbo air cycle machine 38 can include four wheels: the first and second turbine sections 40a, 40b, a compressor section 42, and the power generator 78. The generator 78 can be any suitable type of power generator including, but not limited to, a power generator wheel. By way of additional example, the generator 78 can include a rotor 81 mounted to the common shaft 41 and can include at least one rotor pole 83 a stator can encircle the rotor 81 and having a set of stator windings and the generator output 79 can be electrically coupled with the set of stator windings. The generator 78 can be and suitable generator configured to absorb and transform excess turbine mechanical power into electrical power. Non-limiting power generator 78 configurations can include permanent magnet generators, induction generators, and the like. In one example aspect, the power generator 78 can be selected or configured based on reliability, operating environment (e.g. harsher temperature environments of a pylon or proximity to an engine core), or the like. Aspects of the disclosure can be included wherein the generator 78 can be selected, sized, or configured to generate a predetermined amount of electrical power. The predetermined amount of electrical power can be related to a permanent need for the aircraft, a temporary need for the aircraft, a supplementary need for the aircraft, emergency power demands for the aircraft, or the like. Non-limiting aspects of the disclosure can also include disabling the generator 78 or removing the generator 78 output from the electrical system of the aircraft when the power generated by the generator 78 is not needed.

The generator can provide electrical energy or power in the form of a power output or generator output 79. Such power can then be provided to various portions of the aircraft 10 including distribution system 79a and electric heaters 79b, such as those utilized for de-icing the aircraft 10. It will be understood that the generator 78 can deliver power to any number of type of users or converters on the aircraft 10.

A decoupler 80 can be operably coupled to the common shaft 41 between the compressor section 42 and the generator 78. The decoupler 80 can be any suitable mechanism configured to uncouple the generator 78 from the common shaft 41 or a remainder of the common shaft 41. The decoupler 80 can include, but is not limited to, a clutch system in conjunction with a mechanical fuse disconnect. The decoupler 80 can further include, but is not limited to, a gear box, such as variable gear box, configured to enable re-coupling of the generator 78 to a rotating common shaft 41. It will be understood that the decoupler 80 can be optional and that the generator 78 can alternatively always be coupled to the common shaft 41. The decoupler 80 is configured to decouple the generator 78 without losing the compressor section 42. In one non-limiting example, the decoupler 80 can be configured to decouple the generator 78 upon a failure of or unexpected event during generator 80 operation. In another non-limiting example, the decoupler 80 can be configured to decouple the generator 78 when the power output of the generator 78 is not needed. It is contemplated that the decoupler 80 can be controlled automatically by a processor, such as the controller module 60, or manually by a user.

Embodiments of the disclosure can include aspects wherein the supply ratio of the low pressure bleed air and high pressure bleed air can be selected to never go below, or alternatively, to never exceed, a predetermined ratio. For example, the aspects of the supply ratio can include, or can be determined to maintain an energy or power balance between the turbine sections 40a, 40b and compressor section 42 of the turbo air cycle machine 38. In another example, the aspects of the supply ratio can include, or can be determined to maintain an energy or power balance between the turbine sections 40a, 40b and the combination of the compressor section 42 and the generator 78 of the turbo air cycle machine 38. Another non-limiting example of the proportional mixing-ejector valve assembly or controllable valve assembly 45 can be included wherein the low pressure bleed port 34 of the gas turbine engine 12 can be fluidly coupled with the compressor section 42 of the turbo air cycle machine 38 by way of a first controllable valve 46. Additionally, the high pressure bleed port 36 of the gas turbine engine 12 can be directly fluidly coupled with the first turbine section 40a of the turbo air cycle machine 38 by way of a second controllable valve 50. Non-limiting examples of the first or second controllable valves 46, 50 can include a fully proportional or continuous valve.

The proportional valve can operate in response to, related to, or as a function of the aircraft flight phase or the rotational speed of the gas turbine engine 12. For example, the rotational speed of the gas turbine engine 12 can vary within an operating cycle, during which the proportional mixing-ejector valve assembly or controllable valve assembly 45 can be adjusted based on gas turbine engine transient or dynamic conditions. Embodiments of the disclosure can supply any ratio of low pressure bleed air to high pressure bleed air, such as 100% of first bleed air, and 0% of second bleed air. Similarly, the ratio can be predetermined based on dynamic response to engine conditions and to maintain energy balance, an energy balance bleed air demand, or a power balance between the turbine and compressor sections, or a combination of the compressor sections and the generator, of the turbo air cycle machine assembly.

The low pressure bleed air provided by the low pressure bleed port 34 can be further provided to the first turbine section 40a downstream of the respective first controllable valve 46 and second controllable valve 50, wherein a fluid coupling providing the low pressure bleed air to the first turbine section 40a can include a check valve 52 biased in the direction from the low pressure bleed port 34 toward the high pressure bleed port 36 or the first turbine section 40a of the turbo air cycle machine 38. In this sense, the check valve 52 is configured such that fluid can only flow from the low pressure bleed port 34 to the high pressure bleed port 36 or the first turbine section 40a of the turbo air cycle machine 38.

Embodiments of the disclosure can be included wherein the check valve 52 is selected or configured to provide fluid traversal from the low pressure bleed port 34 toward the high pressure bleed port 36 under defined or respective pressures of the flow in the respective the low pressure bleed port 34 toward the high pressure bleed port 36. For example, the check valve 52 can be selected or configured to only provide fluid traversal, as shown, the air pressure of the high pressure bleed port 36 is lower or less than the air pressure of the low pressure bleed port 34. In another example, the check valve 52 can be selected or configured such that the valve 52 closes, or self-actuates to a closed position under back pressure, that is when the pressure of the high pressure bleed port 36 is higher or greater than the air pressure of the low pressure bleed port 36. Alternatively, embodiments of the disclosure can include a check valve 52 or the turbo-ejector or the mixing-ejector proportional assembly that is controllable to provide selective fluid traversal from the low pressure bleed port 34 toward the high pressure bleed port 36. The compressor section 42 of the turbo air cycle machine 38 can include a compressor output 54.

The first turbine section 40a can include a first turbine output 56 defining a cooled airflow 70. As used herein, a "cooled" airstream or airflow 70 can describe an airflow having a lower temperature than the airflow received by the first turbine section 40a. The first turbine output 56 can be optionally and proportionally supplied to the second turbine section 40b. More specifically, the first turbine output 56 is illustrated at being fluidly coupled to the second turbine section 40b. The first turbine output 56 can also be fluidly coupled to a bypass conduit 43. As illustrated the bypass conduit 43 can fluidly couple the fluid output 56 of the first turbine section 40a to the downstream turbo-ejector 44 such that the fluid output 56 need not be provided to the second turbine section 40b. A bypass valve 47 is included to selectively control fluid flow through the bypass conduit 43 to the downstream turbo-ejector 44. The bypass valve 47 can be any suitable valve including, but not limited to, a proportional valve or a continuous valve. The second turbine section 40b can include a second turbine output 71 defining an airflow. First turbine output 56 that bypasses the second turbine section 40b has been schematically illustrated with arrows and defines a bypass airflow 73.

The compressor output 54, any second turbine output 71 and any bypass airflow 73 are fluidly combined downstream of the turbo air cycle machine 38. The flow mixer is arranged to fluidly combine the compressor output 54 and any second turbine output 71 and any bypass airflow 73 to a common mixed flow 74 that is supplied to the bleed air inlet 49 of the ECS 48. In this manner, the downstream turbo-ejector 44 fluidly combines fluid outputs from the first turbine section 40a, in the form of bypass airflow 73, and the second turbine section 40b, in the form of a second turbine output 71, with fluid output from the compressor section, in the form of compressor output 54, into a common flow 74 that is supplied to the bleed air inlet 49 of the ECS 48. In this sense, the bleed air system 20 preconditions the bleed air before the bleed air is received by the bleed air inlet 49 of the ECS 48.

The second turbine output 71 and bypass airflow 73 are fluidly coupled to define a combined turbine output airflow 75 or cooled airflow. In the illustrated embodiment of the flow mixer, the turbo-ejector 44 pressurizes the turbine output airflow 75 as it traverses a narrow portion 58, or "throat" of the turbo-ejector 44, and fluidly injects the compressor output 54 into the narrow portion 58 of the turbo-ejector 44. The injection of the compressor output 54 into the pressurized turbine output airflow 75 fluidly combines the compressor output 54 with the cooled airflow of the turbine output airflow 75. The common airflow stream 74 of the turbo-ejector 44 is fluidly coupled downstream with the ECS 48 at a bleed air inlet 49. Embodiments of the disclosure can be included wherein the compressor output 54, the turbine output airflow 75, or the turbo-ejector 44 (e.g. downstream from the narrow portion 58) can include a set of sensors 28.

The turbo-ejector 44, sometimes referred to as an "ejector pump" or an "ejector valve," works by injecting air from a higher pressure source into a nozzle at the input end of a venturi restriction, into which a lower pressure air source is also fed. Air from the higher pressure source is emitted downstream into the lower pressure flow at high velocity. Friction caused by the adjacency of the airstreams causes the lower pressure air to be accelerated ("entrained") and drawn through the venturi restriction. As the higher pressure air ejected into the lower pressure airstream expands toward the lower pressure of the low pressure air source, the velocity increases, further accelerating the flow of the combined or mixed airflow. As the lower pressure air flow is accelerated by its entrainment by the higher pressure source, the temperature and pressure of the low pressure source are reduced, resulting in more energy to be extracted or "recovered" from the turbine output. Non-limiting embodiments of the disclosure can be included wherein the high pressure air source is at a higher or greater temperature than the low pressure air source. However, in alternative embodiments of the disclosure, the entrainment and mixing process can occur without the high pressure air source having a higher or greater temperature than the low pressure air source. The above-described embodiments are application to the turbo-ejector 44 illustrated downstream of the turbo air cycle machine 38, as well as to the turbo-ejector embodiment of the controllable valve assembly 45.

The aircraft 10 or bleed air system 20 can also include a controller module 60 having a processor 62 and memory 64. The controller module 60 or processor 62 can be operably or communicatively coupled to the bleed air system 20, including its sensors 28, the first controllable valve 46, the second controllable valve 50, the bypass valve 47, and the ECS 48.

The controller module 60 or processor 62 can further be operably or communicatively coupled with the sensors 28 dispersed along the fluid couplings of the bleed air system 20. The memory 64 can include random access memory (RAM), read-only memory (ROM), flash memory, or one or more different types of portable electronic memory, such as discs, DVDs, CD-ROMs, etc., or any suitable combination of these types of memory. The controller module 60 or processor 62 can further be configured to run any suitable programs. Non-limiting embodiments of the disclosure can be included wherein, for example, the controller module 60 or processor 62 can also be connected with other controllers, processors, or systems of the aircraft 10, or can be included as part of or a subcomponent of another controller, processor, or system of the aircraft 10. In one example, the controller module 60 can include a full authority digital engine or electronics controller (FADEC), an onboard avionic computer or controller, or a module remoted located by way of a common data link or protocol.

A computer searchable database of information can be stored in the memory 64 and accessible by the controller module 60 or processor 62. The controller module 60 or processor 62 can run a set of executable instructions to display the database or access the database. Alternatively, the controller module 60 or processor 62 can be operably coupled to a database of information. For example, such a database can be stored on an alternative computer or controller. It will be understood that the database can be any suitable database, including a single database having multiple sets of data, multiple discrete databases linked together, or even a simple table of data. It is contemplated that the database can incorporate a number of databases or that the database can actually be a number of separate databases. The database can store data that can include, among other things, historical data related to the reference value for the sensor outputs, as well as historical bleed air system 20 data for the aircraft 10 and related to a fleet of aircraft. The database can also include reference values including historic values or aggregated values.

During gas turbine engine 12 operation, the bleed air system 20 supplies a low pressure bleed airflow 66 along the low pressure bleed port 34 and a high pressure bleed airflow 68 along the high pressure bleed port 36, as previously explained. The high pressure bleed airflow 68 is delivered to the first turbine section 40a and optionally the second turbine section 40b of the turbo air cycle machine 38, which in turn interacts with the turbine(s) to drive the rotation of the first turbine section 40a and the second turbine section 40b. The high pressure bleed airflow 68 exits the first turbine section 40a at the first turbine output 56 as a first turbine output airflow. A first portion of the low pressure bleed airflow 66 can be delivered to the compressor section 42 and a second portion of the low pressure bleed airflow 66 can be delivered to the first turbine section 40a and optionally the second turbine section 40b of the turbo air cycle machine 38, depending on the operation of the check valve 52 or upstream turbo-ejector or mixing-ejector proportional assembly, or the respective airflows 66, 68 of the respective low pressure bleed port 34 and high pressure bleed port 36, as explained herein. For example, embodiments of the disclosure can include operations wherein the airflow delivered to the first turbine section 40a and optionally the second turbine section 40b can include entirely low pressure bleed airflow 66, no low pressure bleed airflow 66, or a portion therebetween. The second portion of the low pressure bleed airflow 66 can also be utilize to drive the rotation of the first turbine section 40a and the second turbine section 40b, such as when the controllable valve 50 is set to provide no high pressure bleed airflow 68.

It will be understood that the controller module 60 is configured to operate the bypass valve 47 to supply an amount of the first turbine output 56 to the second turbine section 40b of the turbo air cycle machine 38. It is contemplated that the controller 60 can operate the bypass valve 47 based on input from any of the sensors 28 including temperature sensors of the combined airflow stream 74, the turbine output airflow 75, the first turbine output 56, any combination thereof, etc. Embodiments of the disclosure can include operations wherein the first turbine output 56 delivered to the second turbine section 40b can include supplying less than 100% of the cooled air stream or first turbine output 56 to the second turbine section 40b or supplying 100% of the first turbine output 56 to the second turbine section 40b.

The low pressure bleed airflow 66 can be compressed by the rotation of the compressor section 42, which is rotatably coupled with the first turbine section 40a and the second turbine section 40b. The compressed low pressure bleed air exits the compressor section 42 at the compressor output 54 as compressor output airflows 72. The turbine output airflow 75 and the compressor output airflow 72 are combined in the turbo-ejector 44 to form the combined airflow stream 74, which is further provided to the ECS 48. In this sense, the combined airflow stream 74 can be expressed as a composition or a ratio of the low pressure and high pressure bleed airflow 66, 68, or a composition of a ratio of the turbine output and compressor output airflows 75, 72.

The compression of the low pressure airflow 66, by the compressor section 42, generates a higher pressure and higher temperature compressor output airflow 72, compared with the low pressure airflow 66. Additionally, the airflows received by the first turbine section 40a and the second turbine section 40b, that is, the high pressure airflow 68 and selective low pressure airflow 66 via the check valve 52 via a turbo-ejector or mixing-ejector proportional assembly, generates a lower pressure and a lower temperature turbine output airflow 75, compared with the first turbine section 40a and the second turbine section 40b input airflows 66, 68. In this sense, the compressor section 42 outputs or emits a hotter and higher pressure airflow of the compressor output airflow 72, while the first turbine section 40a outputs or emits a cooler and lower pressure airflow 70, compared with the relative input airflows 66, 68. The second turbine section 40b outputs or emits an even cooler airflow 71 as compared with the airflow 70.

The controller module 60 or processor 62 can be configured to operably receive a bleed air demand, generated by, for example, the ECS 48. The bleed air demand can be provided to the controller module 60 or processor 62 by way of a bleed air demand signal 76, which can include bleed air demand characteristics included, but not limited to, flow rate, temperature, pressure, or mass flow (e.g. airflow). In response to the bleed air demand signal 76, the controller module 60 or processor 62 can operably supply proportional amounts of the low pressure bleed airflow 66 and high pressure bleed airflow 68 to the turbo air cycle machine 38. The proportionality of the low pressure bleed airflow 66, and the high pressure bleed airflows 68 can be controlled by way of the respective first or second controllable valves 46, 50, and by selective operation of the check valve 52 or turbo-ejector proportional assembly.

The proportional supplying of the low pressure and high pressure bleed airflows 66, 68 can be directly or geometrically proportional to the turbine output airflow 75 and compressor output airflow 72, or the turbine air cycle machine 38 operations. The turbine output airflow 75 and compressor output airflow 72 are combined downstream of the turbo air cycle machine 38, and the combined airflow stream 74 is provided to the ECS 48. In one non-limiting example, the compressor output airflow 72 can drive the turbine output airflow 75 into the narrow portion 58 and mix under sonic conditions. The mixed flow pressure will recover statically through the combined airflow stream 74 to output the turbo-ejector 44 at desired conditions. In this sense, the combined airflow stream 74 is conditioned by way of operation of the bleed air system 20, controllable valves 46, 50, check valve 52, turbo-ejector or mixing -ejector proportional assembly, turbo air cycle machine 38, the combining of the turbine output airflow 75 and the compressor output airflow 72, or any combination thereof, to meet or satisfy the ECS 48 demand for bleed air.

One of the controller module 60 or processor 62 can include all or a portion of a computer program having an executable instruction set for determining the bleed air demand of the ECS 48, proportionally or selectively supplying the low pressure or high pressure bleed airflows 66, 68, operating the controllable valves 46, 50, the check valve's 52 or turbo-ejector or mixing-ejector proportional assembly's operation in response to the respective high pressure and low pressure airflows 66, 68, or a combination thereof. As used herein, "proportionally or selectively supplying" the low pressure or high pressure bleed airflows 66, 68 can include altering or modifying at least one of the low pressure or high pressure bleed airflows 66, 68. For example, proportionally or selectively supplying the low pressure or high pressure bleed airflows 66, 68 can include altering the low pressure bleed airflow 66 without altering the high pressure bleed airflow 68, or vice versa. In another example proportionally or selectively supplying the low pressure or high pressure bleed airflows 66, 68 can include altering the low pressure bleed airflow 66 and the high pressure bleed airflow 68. Also as used herein, "proportionally" supplying the low pressure or high pressure bleed airflows 66, 68 can include altering or modifying the ratio of low pressure bleed airflow 66 to high pressure bleed airflow 68, based on the total bleed airflow 66, 68 supplied. Stated another way, the proportions of low or high pressure bleed airflow 66, 68 can be altered or modified, and a proportional ratio can be included or described based on the total airflow of the low and high pressure bleed airflows 66, 68.

Regardless of whether the controller module 60 or processor 62 controls the operation of the bleed air system 20, the program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, and the like, that have the technical effect of performing particular tasks or implementing particular abstract data types. Machine-executable instructions, associated data structures, and programs represent examples of program code for executing the exchange of information as disclosed herein. Machine-executable instructions can include, for example, instructions and data, which cause a general-purpose computer, special purpose computer, or special purpose processing machine to perform a certain function or group of functions.

While the bleed air characteristics of the low pressure or high pressure bleed airflows 66, 68 can remain relatively consistent or stable during a cruise portion of a flight by the aircraft 10, varying aircraft 10 or flight characteristics, such as altitude, speed or idle setting, heading, solar cycle, or geographic aircraft location can produce inconsistent airflows 66, 68 in the bleed air system 20. Thus, the controller module 60 or processor 62 can also be configured to operate the bleed air system 20, as explained herein, in response to receiving a set of sensor input values received by the sensors 28 dispersed along the fluid couplings of the bleed air system 20. For example, the controller module 60 or processor 62 can include predetermined, known, expected, estimated, or calculated values for the set of airflows 66, 68, 70, 71, 72, 73, 74, 75 traversing the bleed air system 20. In response to varying aircraft 10 or flight characteristics, the controller module 60 or processor 62 can alter the proportional supplying of the low pressure or high pressure bleed airflows 66, 68 in order to meet or satisfy the bleed air demand for the ECS 48. Alternatively, the memory 64 can include a database or lookup table such that a proportional supplying values related to the low pressure or high pressure bleed airflows 66, 68 can be determined in response to the controller module 60 receiving a set or subset of sensor 28 readings, measurements, or the like.

While sensors 28 are described as "sensing," "measuring," or "reading" respective temperatures, flow rates, or pressures, the controller module 60 or processor 62 can be configured to sense, measure, estimate, calculate, determine, or monitor the sensor 28 outputs, such that the controller module 60 or processor 62 interprets a value representative or indicative of the respective temperature, flow rate, pressure, or combination thereof. Additionally, sensors 28 can be included proximate to, or integral with additional components not previously demonstrated. For example, embodiments of the disclosure can include sensors 28 located to sense the combined airflow stream 74, or can include sensors 28 located within the narrow portion 58, or "throat" of the turbo-ejector 44.

Figure 4:
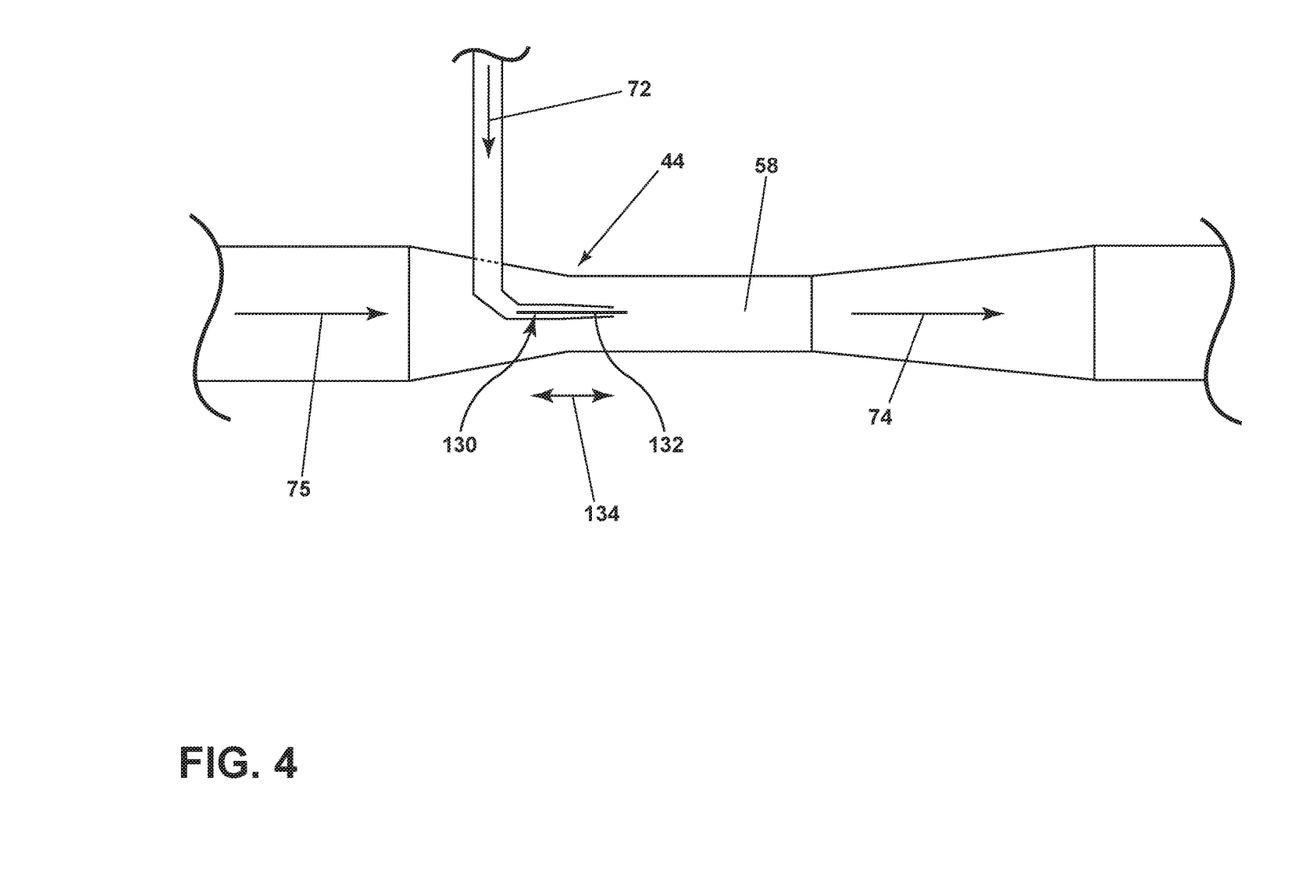
FIG. 4 is a schematic view of a valve that can be utilized in a turbo-ejector as shown in FIG. 3.

FIG. 4 illustrates in more detail that a valve 130 can be included in the flow mixer or turbo-ejector 44 located downstream from the turbo air cycle machine 38. By way of non-limiting example, the valve 130 can include a controllable pintle injector utilized to control the injection of the compressor output 54 into the throat portion 58 of the turbo-ejector 44. The valve 130 can include a slidable needle 132 linearly actuated in either directions as indicated by arrow 134. The slidable needle 132 or pintle can be proportionally & linearly actuated to increase or decrease the nozzle exit flow area discharge into the throat 58 which can in turn operably affect the ratio of entrainment of lower pressure air of the turbine output airflow 75 versus injected higher pressure air of the compressor output airflow 72 and the overall turbo ejector efficiency as a pumping mechanism. The varying of lower pressure mass airflow of the turbine output airflow 75 versus higher pressure mass airflow of the compressor output airflow 72 ratio increases or decreases the range of operability of the turbo ejector which affects its efficiency. In this sense, efficiency is a function of pressure, temperature, and mass flow ratios. Thus, any variation of pressure, temperature, and mass flow ratios operably affects the efficiency output rating. The needle 132 may be controllably operated, for example, via the controller module 60 to maintain a pre-determined mass flow ratio, to maintain an efficiency rating, or to operate the turbo-ejector 44 relative to a predetermined threshold or threshold range.

Such a valve allows control of turbo ejector efficiency and allows control of the low pressures and high pressure mass flow ratios.

In a first non-limiting mode of operation, the decoupler 80 can be enabled or activated (i.e. the generator 78 does not co-rotate with the common shaft 41). In this example, the controller module 60 can control the high pressure controllable valve 50 to control an exit pressure of the combined airflow stream 74 of the turbo-ejector 44. This can be considered a master control in baseline system logic. The controller module 60 can control the low pressure controllable valve 46 to control a compressor power balance and such can be a slave control to that of the high pressure controllable valve 50. The controller module 60 can control the operation of the valves to control an exit temperature of the combined airflow stream 74 of the turbo-ejector 44 and such control can be linked to master control of the high pressure controllable valve 50. Such baseline system logic would also include a closed position of the check valve 52.

In another non-limiting example of the first mode of responsive operation, the controller module 60 can operate the second controllable valve 50 based on a bleed air demand of the bleed air system 20. The bleed air demand can include, for example, a desired or demanded output airflow stream 74 from the turbo-ejector 44. In this sense, the controller module 60 can operate the second controllable valve 50 based on a desired or demanded output airflow stream 74 of the turbo-ejector 44. The controller module 60 can further operate, for example, the bypass valve 47 such that the bypass airflow 73 of the first turbine output 56, when combined with the second turbine output 71, affects a cooling of the turbine output airflow 75, which in turn operably affects or controls the temperature of the output airflow stream 74, based on a bleed air demand of the bleed air system 20, such as a desired or demanded temperature of the output airflow stream 74. Thus, during the first mode of operation, if the temperature of the output airflow stream 74 is below or less than a threshold, demanded, or desired temperature, as sensed by a sensor 28, the bypass valve 47 can be operably opened such that air will flow from the first turbine output 56 to the turbine output airflow 75. In this sense, the opening of the bypass valve 47 can operably raise the temperature of the output airflow stream 74. During the first mode of operation, if the temperature of the output airflow stream 74 is above or greater than the threshold, demanded or desired temperature of the output airflow stream 74, as sensed by a sensor 28, the bypass valve 47 can be operably closed such that no bypass airflow 73 is provided to the turbine output airflow 75, and ultimately, the output airflow stream 74. In this sense, the closing of the bypass valve 47 can operably lower the temperature of the output airflow stream 74.

In another non-limiting example of the first mode of responsive operation, the controller module 60 can operate the second controllable valve 50 based on a bleed air demand including a desired or demanded pressure of the output airflow stream 74. If the pressure of the output airflow stream 74, as sensed by a sensor 28, is below or less than a threshold, demanded, or desired pressure, the second controllable valve 50 can operably open to provide or allow a portion or additional high pressure bleed airflow 68 to the turbo air cycle machine 38. As the second controllable valve 50 provides or allows high pressure bleed airflow 68 to the turbo air cycle machine 38, the turbine sections 40*a*, 40*b* will rotate faster, generating more rotational power, which in turn, affects the total amount of power for the compressor section 42 to absorb. In this sense, the second controllable valve 50 can be operated to modify or adjust the pressure of the output airflow stream 74 based on a desired or demanded pressure.

In another non-limiting example of the first mode of responsive operation, the controller module 60 can operate the second controllable valve 50 based on a bleed air demand, wherein if the turbine sections 40a, 40b are generating more rotational power or rotational power in excess of the compressor section 42 absorption.

In another non-limiting example of the first mode of responsive operation, the first controllable valve 46 can be controllably operated by the controller module 60, and based on the compressor output airflow 72, as sensed by the sensor 28, maintain a power balance between the turbine sections 40a, 40b generating power and the compressor section 42 absorbing power. In this sense, the controller module 60 can be configured to operate the first and second controllable valves 46, 50 simultaneously. In yet another non-limiting example of the first mode of responsive operation, the first controllable valve 46 can be controllably operated by the controller module 60, and based on the compressor output airflow 72, as sensed by the sensor 28, maintain a power balance between the turbine sections 40a, 40b, and the compressor section 42 absorbing power.

In a second non-limiting mode of operation, the decoupler 80 can be disabled or deactivated (i.e. the generator 78 co-rotates with the common shaft 41). The system logic in the second mode of operation can be similar to the system logic in the first mode of operation described above, unless otherwise stated. In the second mode of operation, the controller module 60 can be configured to operate or control the generator 78 or power generation operations. During the second mode of operation, the first turbine section 40a and optionally the second turbine section 40b are turned via the airflow the first turbine section 40a and the second turbine section 40b generate work to spin the common shaft 41. What work is not utilized to operate the compressor section 42 can be utilized by the generator 78 to generate electrical power. The generator 78 can be controlled synchronously with the speed of the common shaft 41, which in turn can be controlled by the master control of the high pressure controllable valve 50. The electrical power generated by the generator 78 can be, for example, supplied to additional electrical loads 79a, 79b, as described herein. In one non-limiting example, the maintaining a power balance can be based on an expected or desired electrical power load or electrical power-generating operation of the generator 78. In this sense, the power balancing can include an electrical power demand.

Additional aspects of the disclosure can be included wherein a separate power generation control module can be included and communicatively coupled with the controller module 60, and configured to, for example, reporting power generation, sharing electrical distribution load management tasks, or operably control the power generation by the generator 78 (e.g. during override power generation mode, etc.), or the like. In another aspect, an engine electrical power generation system (EEPGS) can be included separate from, and communicatively coupled with, the controller module 60.

The operation or control of the generator 78 can be selected, configured, or operated to manage the power distribution or power consuming systems 79a, 79b, or a subset thereof. For example, the generator 78 can be operated to manage the subset of the power distribution or power consuming systems not related to thermal activities (e.g. only the distribution system 79a). Additionally non-limiting aspects of the second mode of operation can be included wherein the controller module 60 can operate the generator 78 or power consuming systems 79a, 79b based on a power demand for operating a thermal device, such as the electric heaters 79b. In one instance, the controller module 60 can operate the electric heaters 79b to utilize a power storage device, such as a battery instead of utilizing power generation to operate the electric heaters (if applicable), or can control the generator 78 to operate in an override power generation mode to selectively generate the amount of electrical power needed to satisfy a power demand for either systems 79a and/or 79b.

In this example, the controller module 60 can be configured to determine, calculate, or estimate an amount of power demanded or requested to operate the electric heaters 79b. Thus, the second mode of operation can operate to, for example, utilize the controller module 60 to operate the second controllable valve 50 to increase or decrease the mechanical work provided to the common shaft 41 by the first or second turbine sections 40a, 40b, based on the power demand and power balance considerations. In this override mode of operation, the controller module 60 can also control the first controllable valve 46 to effect a desired or demanded output airflow pressure 74 from the turbo-ejector 44, as needed, based on the bleed air demand, as described herein. During the second mode of operation, the controller module 60 can further operate (e.g. open, close) the bypass valve 47 to operably raise or lower the temperature of the output airflow stream 74 based on the bleed air demand, as described herein. The controller module can also control the operation of the valve 130 as described, by operably controlling the energy balance or the high pressure/low pressure mass flow ratio as needed, or within a predetermined threshold or threshold range, such as to prevent back flow to the turbine outputs. By means of controlling the high and low pressure mass flows as described above, the controllable ejector valve can restrict the enthalpy flows split between the turbine sections and compressor section. In this sense, the controlling of the high and low pressure mass flows not only ensure a power balance with the power generator 78, but also to limit the amount of excess turbine power being absorbed by the generator 78.

The aforementioned configuration and operations of the valves 46, 50, 47 allows for, causes, or affects the adiabatic change in efficiency of the turbo-ejector.

Embodiments of the disclosure can be included wherein the controller module 60 or processor 62 can be configured to operate the bleed air system 20 to account for sensor 28 measurements in the set or a subset of the airflows 66, 68, 70, 71, 72, 73, 74, 75.

In another embodiment of the disclosure, the bleed air system 20 can operate without feedback inputs, that is, without the controller module 60 or processor 62 receiving sensed information from the sensors 28. In this alternative configuration, the controller module 60 or processor 62 can be configured to operate the first or second controllable valves 46, 50, and the like based on operation of the aircraft 10, such as the aircraft 10 flight phases.

In one non-limiting example configuration of the bleed air system 20, the low pressure bleed airflow can include a pressure of 12.2 psi and a temperature of 252.5 degrees F., while high pressure bleed airflow can include a pressure of 148.3 psi and a temperature of 842.3 degrees. In this example, check valve 52 and the bypass valve 47 are closed and the turbo air cycle machine 38 operates to produce a turbine output airflow 75 having a pressure of 17.1 psi and a temperature of 390.8 degrees F., while the compressor output airflow 72 can include a pressure of 40.3 psi and a temperature of 445.6 degrees F. The turbo-ejector 44 can be configured to combine the turbine output airflow 75 and the compressor output airflow 72 to provide a combined airflow stream 74 including a pressure of 27.0 psi and a temperature of 421.5 degrees F. In such an example, the generator 78 is capable of outputting 6.74 kW of power. The aforementioned example configuration and values are merely one non-limiting example of the bleed air system 20 described herein.

The above described disclosure with the second stage turbine 40b allows the turbo air cycle machine 38 to have increased cooling capacity, allows for higher bleed stage extraction from the gas turbine engine 12, and allows for increased turbine power generation as compared to a turbo air cycle machine with only one turbine section. The inclusion of the second stage turbine bypass allows second stage unloading at lower high pressure bleed port extraction stages, reduces unnecessary second turbine stage excess power, and allows second stage turbine exit temperature control.

Figure 5:
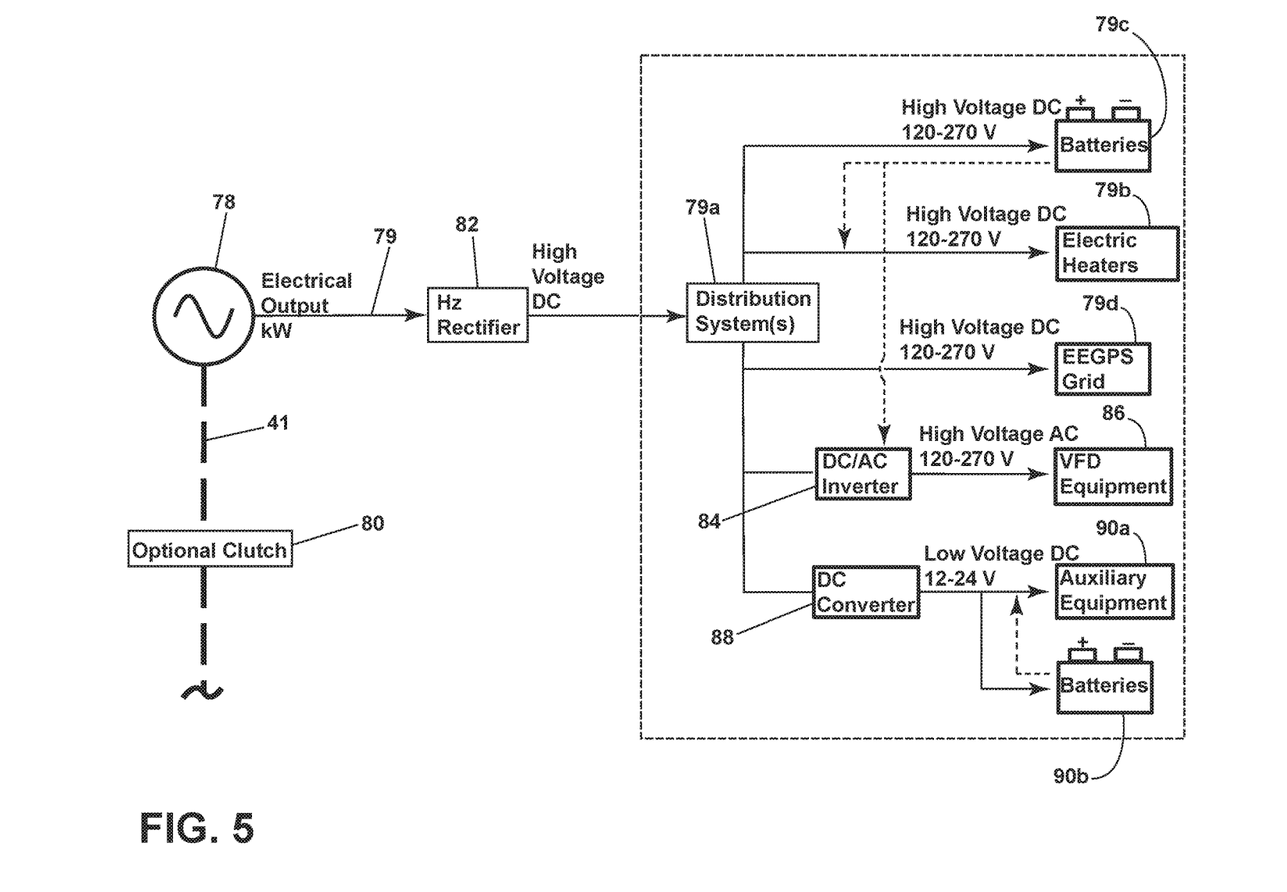
FIG. 5 is a schematic illustration of the generator of FIG. 3 and exemplary power systems of the aircraft of FIG. 1 in accordance with various aspects described herein.

FIG. 5 is a schematic view of exemplary options where the electrical power generated by the generator 78 can be utilized in the aircraft 10. A rectifier 82 is illustrated, the rectifier 82 can utilize the generator output 79, which is alternating current to produce direct current in the form a high voltage direct current. Such direct current can then be provided to various portions of the aircraft including distribution system 79a and electric heaters 79b, such as those utilized for de-icing the aircraft 10. It will be understood that the generator 78 can deliver high voltage DC power to a plurality of electrical power users or converters on the aircraft 10. By way of non-limiting example high voltage DC is shown as being supplied to batteries 79c, an EEGPS grid 79d, an inverter 84, which in turn provides high voltage AC power to VDF or other direction equipment 86, and a DC converter 88, which in turn can supply low voltage DC power to auxiliary equipment 90a and batteries 90b. Aspects of the disclosure can be included wherein, for example, electrical power generated by the generator 78 can be used to charge or otherwise store electrical power in power storage devices such as the batteries 79c, 90b, or another power storage device such as a supercapacitor. The power storage devices can be discharged at a later time to supplement power demand needs for DC or AC systems (e.g. via a power inverter). The discharge of the power stored in the power storage devices can affect the operation of the generator 78 or decoupler 80, including but not limited to, selectively not operating the generator 78 when a sufficient amount of power stored can operate the electric heaters 79b.

Figure 6:
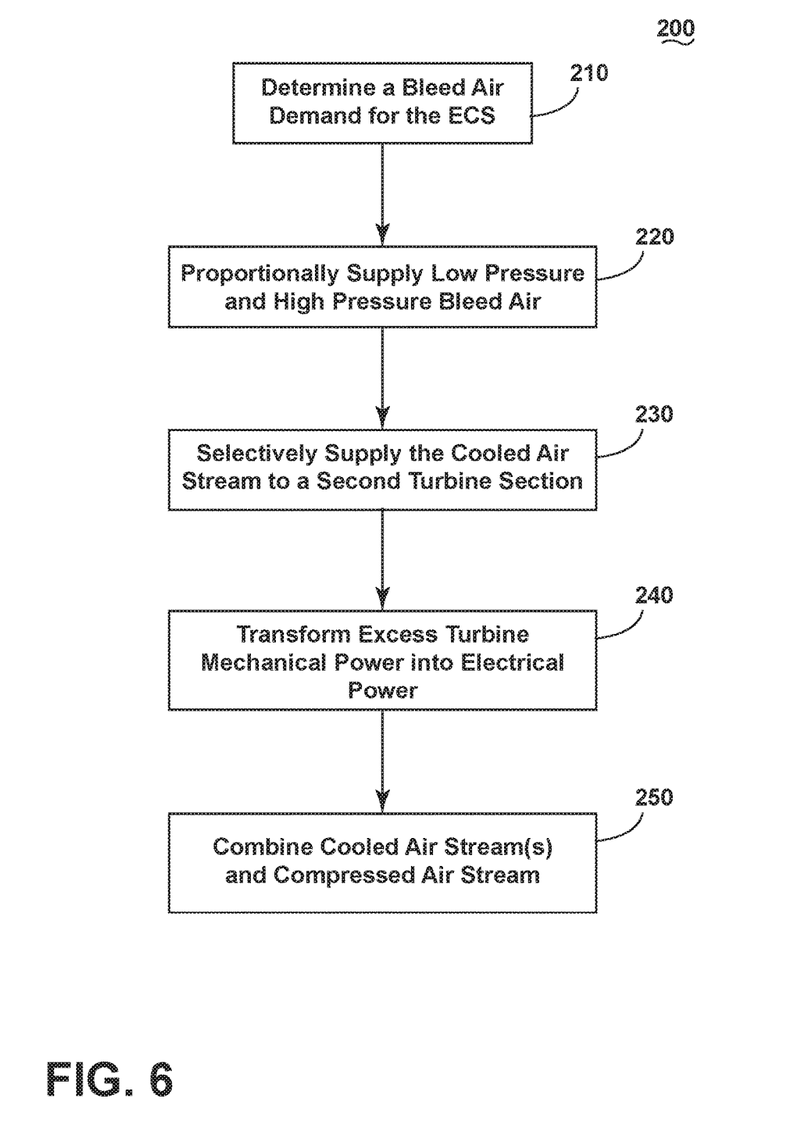
FIG. 6 is an example a flow chart diagram illustrating a method of providing bleed air to the environmental control system in accordance with various aspects described herein.

FIG. 6 illustrates a flow chart demonstrating a non-limiting example method 200 of providing bleed air to the ECS 48 of an aircraft using at least one gas turbine engine 12. The method 200 begins at 210 by determining a bleed air demand for the ECS 48. Determining the bleed air demand can include determining at least one of an air pressure, an air temperature, or a flow rate demand for the ECS 48, or a combination thereof. The bleed air demand can be a function of at least one of the number of aircraft passengers, aircraft flight phase, or operational subsystems of the ECS 48. The bleed air demand can be determined by the ECS 48, the controller module 60, or the processor 62 based on the bleed air demand signal 76 from the ECS 48.

Next at 220, the controller module 60 or the processor 62 operably controls the controllable valve assembly 45 to proportionally supply the low pressure and high pressure bleed air to the turbo air cycle machine 38. Embodiments of the disclosure can include, but are not limited to, supplying up to 100% of the combined airflow stream 74 of one of the low pressure or high pressure bleed airflow and 0% of the corresponding other of the low pressure or high pressure bleed airflow. Another example embodiment of the disclosure can include, but is not limited to, proportionally supplying the low pressure and high pressure bleed airflows wherein the proportionally supplying is related to, or is a function of the aircraft flight phase or rotational speed of the gas turbine engine 12. The proportionally supplying of the bleed air can include continuously proportionally supplying the bleed air, that is, repeatedly altering the proportional supplying of the low pressure and high pressure bleed airflows over a period of time, or indefinitely during the flight of the aircraft.

At 230, the bypass valve 47 can be controlled by the controller module 60 or the processor 62 such that output from the first turbine section 40a is directed to the second turbine section 40b to create a further cooled air stream or second turbine output 71 or through the bypass conduit 43 to create a bypass airflow 73. As used herein "further cooled" air stream describes that the air stream of the second turbine output 71 has a lower temperature than the output of the first turbine section 40a that is directed to the second turbine section 40b. Embodiments of the disclosure can include, but are not limited to the bypass valve 47 being controlled to supply any amount from 0% to 100% of the first turbine output 56 to the second turbine section 40b and the remainder to the bypass conduit 43. The controller module 60 or the processor 62 can control the bypass valve 47 in order to control the exit temperature of the turbo air cycle machine 38.

At 240, the generator 78 can selectively transform any excess turbine mechanical power into electrical power, for example, based on a power demand. It is contemplated that the controller module 60 or the processor 62 can determine, calculate, estimate, or otherwise ascertain the required surplus of turbine power in the system to satisfy an electrical power demand as supplied by generator 78. More specifically, the controller module 60 or the processor 62 can determine the total mechanical power created by the first turbine section 40a and the second turbine section 40b and compare it with the power consumption of the compressor section 42 and that of the generator 78 to determine the amount of power that can be converted into electrical power. This can be done in any suitable manner including by way of sensor information or valve position information. Any excess mechanical power can be transferred via the common shaft 41 to the generator 78.

In such instances, the proportionally supplying, at 220, can be controlled such that excess mechanical power is generated for the generator 78 to transform into electrical power. It is contemplated that the method can include determining a power demand from a device or system of the aircraft 10. This can include the controller module 60 or the processor 62 calculating or estimating the power demand. The proportionally supplying, at 220, can then be based on the determined power demand including that when more power is demanded HP bleed air pressure can be increased to supply the turbo machine 38 based on the determined power demand. It is also contemplated that the controller module 60 or the processor 62 can operate to decouple the generator 78 from the common shaft 41. More specifically, the controller 60 or processor 62 can operate the decoupler 80 so that the second generator 78 is not operably coupled to the common shaft 41 such as when it is determined there is no excess mechanical power, wherein there is no electrical power demand, or when there is an insufficient power demand, such as a power demand that can be satisfied by way of discharging a power storage device.

It will be understood that the turbo air cycle machine 38 emits a cooled air stream from the first turbine section 40a in the form of bypass airflow 73 or the second turbine section 40b in the form of a further cooled airflow 71 and a compressed air stream of the of the compressor output airflow 72 from the compressor section 42. At 250, the method 200 continues by combining the cooled air stream, in the form of the bypass airflow 73 the further cooled airflow stream in the form of the second turbine output 71 and the compressed air stream of the compressor output airflow 72 to form a conditioned or combined airflow stream 74. It will be understood that the combined compressed air stream of the compressor output airflow 72 can be combined with at least one of the bypass airflow 73 or the second turbine output 71 to form the conditioned air stream 74.

The proportional supplying the low pressure and the high pressure bleed air at 220 and the selectively supplying at 230 is controlled by the controller module 60 or processor 62 such that the combined airflow stream 74 meets or satisfies the bleed air demand for the ECS 48 as determined at 210. Aspects of the method can also be included wherein the combined airflow stream 74 can be altered, modified, or the like, by way of operating the controllable pintle injector, the valve 130, or the slidable needle 132.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

The method can include proportionally supplying the compressor section based on desired flow capacity. The method can also include proportionally supplying low pressure bleed air and high pressure bleed air from a compressor of the gas turbine engine to a turbo air cycle machine to precondition the bleed air according to operational demands of the ECS wherein the preconditioning comprises selectively providing a fluid output emitted from a first turbine section 40a of the turbo air cycle machine 38 to a second turbine section 40b of the turbo air cycle machine 38 for further cooling. As described above this can be based on temperature demands of the ECS.

In one non-limiting example, the controller module 60 can control the controllable valve 50 to be opened or closed as a master control to operably control an exit pressure of the combined airflow stream 74 of the turbo-ejector 44. In a non-limiting example, the controller module 60 can also control the first controllable valve 46 as a slave to the master control, to operably control the energy balance between the turbine sections 40a, 40b and the compressor section 42 and generator 78. This can be considered a master control in baseline system logic. The controller module 60 can control the controllable valve 46 to control a total compressor power balance in the turbo air cycle machine 38 and such can be a slave control to that of the controllable valve 50. The controller module 60 can control the source selected by the controllable valve 46 and such a source selection can be set based on the mission schedule of the aircraft 10. The controller module 60 can control the controllable valve 46 to match outlet pressures from the compressor section 42. In a non-limiting example, the check valve 52 can be closed or self-closed by default.

In one non-limiting example, the controller module 60 can also control the bypass valve 47, and therefore an exit temperature of the combined airflow stream 74 of the turbo-ejector 44 simultaneously, but independently with the controllable valve 46. For instance, in some cases, lowering or reducing the exit pressure of the combined airflow stream 74 by way of the second controllable valve 50 operation will also lower or reduce the exit temperature of the combined airflow stream 74. In this sense, the operation of the second controllable valve 50 can be included as an override consideration to reduce or lower at least one of the temperature or pressure of the combined airflow stream 74 if operation of the bypass valve 47 is inadequate, insufficient, or otherwise unable to operably control the temperature or pressure of the combined airflow stream 74, as described herein. For instance, if the bypass valve 47 were to fail or be rendered inoperable, or if the bypass valve 47 is fully opened or closed despite the inability to alter the combined airflow stream 74 as desired, the system logic can be configured to operate the second controllable valve 50 to alter or adjust the pressure received by the turbine sections 40a, 40b, to operably alter or adjust the temperature of the combined airflow stream 74.

In another non-limiting example, the controller 60 can control the operation of the valve 130 to operably control the low pressure and high pressure mass flow rates, target efficiency, or the like, as described herein, based on desired efficiency of the turbo-ejector 44.

In another non-limiting example, the controller module 60 can operate in an alternate system logic, including but not limited to an emergency operation, for example, such as when the high pressure bleed source is disabled, removed, or shut down. In such an operation the controllable valve 50 is closed and the controller module 60 can control the controllable valve 46 to control an exit pressure of the combined airflow stream 74 of the turbo-ejector 44 as a master control. In this scenario, the check valve 52 can be open, allowing or enabling low pressure bleed airflow 66 to flow to the turbine sections 40a, 40b. The controller module 60 can control the bypass valve 47 to operably control an exit temperature of the combined airflow stream 74 of the turbo-ejector 44.

In another non-limiting example, the controller module 60 can operate to selectively disable the decoupler 80 (i.e. cause the generator 78 to co-rotate with the common shaft 41), and consequently, to generate electrical power via the generator 78, as described herein. In this sense, the generating of electrical power can operably affect the controlling of the system by the controller module 60 such that power demands can be satisfied in addition to, supplementing, or in place of, meeting or satisfying the bleed air demands.

Many other possible embodiments and configurations in addition to that shown in the above figures are contemplated by the present disclosure. For example, embodiments of the disclosure can be included wherein the second controllable valve 50 could be replaced with a bleed ejector or mixing valve also coupled with the low pressure bleed port 34. In another non-limiting example, the turbo-ejector 44, the compressor output 54, or the first turbine output 56 can be configured to prevent backflow from downstream components from entering the turbo air cycle machine 38. With the inclusion of the valve 130, the controller 60 can control the operation of the valve 130 to operably control the energy balance by adjusting the low and high pressure mass flow rations as needed, independent of efficiency considerations. In another example, the controller 60 can control the operation of the valve 130 as described, but by operably controlling the energy balance or the high pressure/low pressure mass flow ratio as needed, or within a predetermined threshold or threshold range, such as to prevent back flow to the turbine outputs or prevent any excessive mechanical power generated through the turbine; causing any excessive imbalance of the turbo machine due to rotational shaft 41 speed beyond that of a pre-determined 'safe' rotational shaft 41 speed, in order to avoid potential failure or excessive electrical power to be generated beyond the capabilities that of the generator 78.

In yet another non-limiting example embodiment of the disclosure, the check valve 52 or turbo-ejector proportional assembly can include, or can be replaced by a third controllable valve, and controlled by the controller module 60 as explained herein, to operate or effect a ratio of low pressure bleed airflow 66 and high pressure bleed airflow 68 supplied to the first turbine section 40a and optionally the second turbine section 40b. Additionally, the design and placement of the various components such as valves, pumps, or conduits can be rearranged such that a number of different in-line configurations could be realized.

The embodiments disclosed herein provide a method and aircraft for providing bleed air to an environmental control system and operably generating electrical power by way of the providing of bleed air. The technical effect is that the above described embodiments enable the preconditioning of bleed air received from a gas turbine engine such that the conditioning and combining of the bleed air is selected to meet or satisfy a bleed air demand for the environmental control system and can include meeting or satisfying a power demand for a power generating system. In this sense, the power generation and bleed air preconditioning can include synchronous or parallel operations to meet or satisfy concurrent bleed air and power demands. Further, the turbo ejector allows for mixing of two different air streams at different pressure while recovering the energy otherwise associated with backpressure of the turbine. Further still, excess mechanical energy can be turned into electrical power. In this manner, power within the system is not wasted and an auxiliary power supply is formed. It is contemplated that such an auxiliary power supply can replace or be utilized in conjunction with traditional ram air turbines.

One advantage that can be realized in the above embodiments is that the above described embodiments have superior bleed air conditioning for the ECS without wasting excess heat, compared with traditional pre-cooler heat exchanger systems. Another advantage that can be realized is that by eliminating the waste of excess heat, the system can further reduce bleed extraction from the engine related to the wasted heat. By reducing bleed extraction, the engine operates with improved efficiency, yielding fuel cost savings, and increasing operable flight range for the aircraft.

Yet another advantage that can be realized by the above embodiments is that the bleed air system can provide variable bleed air conditioning for the ECS. The variable bleed air can meet or satisfy a variable demand for bleed air in the ECS due to a variable ECS load, for example, as subsystems are operated or cease to operate. This includes the advantage of the ability to transform low stage bleed air to air that is suitable for the ECS. Low pressure bleed air pressure can be augmented to a desired pressure for the ECS. Yet another advantage includes that waste cooling energy can be utilized to further assist cooling temperatures of the air for use in the ECS.

Yet another advantage includes the ability to selectively generate power when desirable, to supplement or replace traditional power sources for a set or subset of electrical loads of the aircraft. Aspects described herein can consists of generating power from otherwise un-utilized or under-utilized mechanical power generated in the turbo machine. Another advantage of the above-described aspects can include utilizing electric deicing without having to draw electrical power from the aircraft electrical systems, resulting in a self-sufficient ECS. By utilizing otherwise lost or wasted mechanical power; the engine efficiency or power extraction from the engine, improves without necessarily increasing the amount of bleed air extracted.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of providing bleed air to an environmental control system of an aircraft using a gas turbine engine, the method comprising:
   determining, by a controller module, a bleed air demand for the environmental control systems;
   selectively supplying, by the controller module, low pressure bleed air and high pressure bleed air from a compressor of the gas turbine engine to a first turbine section and compressor section of a turbo air cycle machine rotationally coupled by a common shaft, with the first turbine section emitting a cooled air stream and the compressor section emitting a compressed air stream;
   selectively supplying, by the controller module, the cooled air stream to at least one of a second turbine section, rotatably coupled with the first turbine section, with the second turbine section emitting a further cooled air stream, or to a bypass airflow, bypassing the second turbine section, wherein supplying the cooled air stream to the second turbine section creates excess mechanical power on the common shaft;
   combining at least one of the cooled air stream emitted from the bypass airflow or the further cooled air stream emitted from the second turbine section with the compressed air stream emitted from the compressor section to form a conditioned air stream;
   transforming excess mechanical power into electrical power via a generator rotatably coupled with the common shaft when the cooled air stream is supplied to the second turbine section; and
   delivering electrical power to at least one device or system;
   wherein the selectively supplying low pressure bleed air and high pressure bleed air and selectively supplying the cooled air stream are controlled such that the conditioned air stream satisfies the determined bleed air demand.

2. The method of claim 1 wherein the electrical power is high voltage DC power.

3. The method of claim 1 wherein the electrical power is delivered to at least one of a battery, an electric heater, auxiliary equipment, or a distribution system.

4. The method of claim 1, further comprising determining a power demand from a device or system of the aircraft.

5. The method of claim 4 wherein determining the power demand comprises calculating the power demand.

6. The method of claim 4 wherein the selectively supplying low pressure bleed air and high pressure bleed air is based on the determined power demand.

7. The method of claim 6 wherein the selectively supplying low pressure bleed air and high pressure bleed air comprises increasing the supplying of at least one of the supplied low pressure bleed air or high pressure bleed air based on the determined power demand.

8. The method of claim 1 wherein selectively supplying the cooled air stream to the second turbine section comprises supplying 100% of the cooled air stream to the second turbine section.

9. An aircraft comprising:
an environmental control system having a bleed air inlet;
a gas turbine engine having at least one low pressure bleed air supply and at least one high pressure bleed air supply;
a turbo air cycle machine having a co-rotationally coupled first turbine section, second turbine section, and compressor section, wherein the second turbine section is fluidly connected with an output of the first turbine section;
an upstream turbo-ejector fluidly coupling the low and high pressure bleed air supplies to the first turbine section and compressor section;
a bypass airflow controllably operable by a controller module and fluidly connecting the output of the first turbine section and selectively bypassing the second turbine section;
a downstream turbo-ejector fluidly combining fluid outputs from at least one of the bypass airflow or the second turbine section with fluid output from the compressor section into a common flow that is supplied to the bleed air inlet of the environmental control systems;
a rotatable shaft operably coupled with the first turbine section and the second turbine section; and
a generator selectively coupled by a decoupler to the rotatable shaft and having a power output;
wherein, when the bypass airflow is opened, the generator is selective decoupled from the rotatable shaft, and wherein when the bypass airflow is closed the generator is selectively coupled with the rotatable shaft.

10. The aircraft of claim 9 wherein the generator further comprises a rotor mounted to the rotatable shaft and having at least one rotor pole.

11. The aircraft of claim 10 wherein the generator is at least one of a permanent magnet generator or induction generator.

12. The aircraft of claim 9 wherein the first turbine section, second turbine section, and compressor section are rotationally coupled to the rotatable shaft.

13. The aircraft of claim 9 wherein the bypass airflow further comprising a bypass conduit fluidly coupling the fluid output of the first turbine section to the downstream turbo-ejector.

14. The aircraft of claim 13, further comprising a bypass valve configured to selectively control fluid flow through the bypass conduit.

15. The aircraft of claim 9, further comprising at least one of a device or system electrically coupled to the power output.

16. The aircraft of claim 15 wherein the at least one device or system includes at least one of a battery, an electric heater, or auxiliary equipment.

* * * * *